United States Patent [19]

Wright

[11] Patent Number: 4,663,946
[45] Date of Patent: May 12, 1987

[54] METHOD OF MANUFACTURING KNITTED BRIEFS

[75] Inventor: Kenneth Wright, Melton Mowbray, England

[73] Assignee: Incotex B.V., Muiden, Netherlands

[21] Appl. No.: 857,246

[22] Filed: Apr. 30, 1986

[30] Foreign Application Priority Data

Aug. 21, 1985 [GB] United Kingdom ............... 8521117

[51] Int. Cl.$^4$ .............................................. A41B 9/02
[52] U.S. Cl. ...................................... 66/177; 2/243 B
[58] Field of Search ................. 66/177, 176; 2/243 B, 2/402

[56] References Cited

U.S. PATENT DOCUMENTS 3,985,004 10/1976 Johnson et al. ........................ 66/177
4,048,819  9/1977 Johnson ................................. 66/177
4,527,403  7/1985 Fullbright et al. .................... 66/177

FOREIGN PATENT DOCUMENTS 1212617  3/1960 France .................................. 2/402

Primary Examiner—Ronald Feldbaum
Attorney, Agent, or Firm—Charles E. Brown; Charles A. Brown

[57] ABSTRACT

A plurality of brief blanks are knitted interconnected in side-by-side relationship upon a circular knitting machine. The tube is then slit, either on or off the knitting machine, to sever the interconnection, the slit portions being then coursewise separated to provide a plurality of brief blanks of the required form.

10 Claims, 8 Drawing Figures

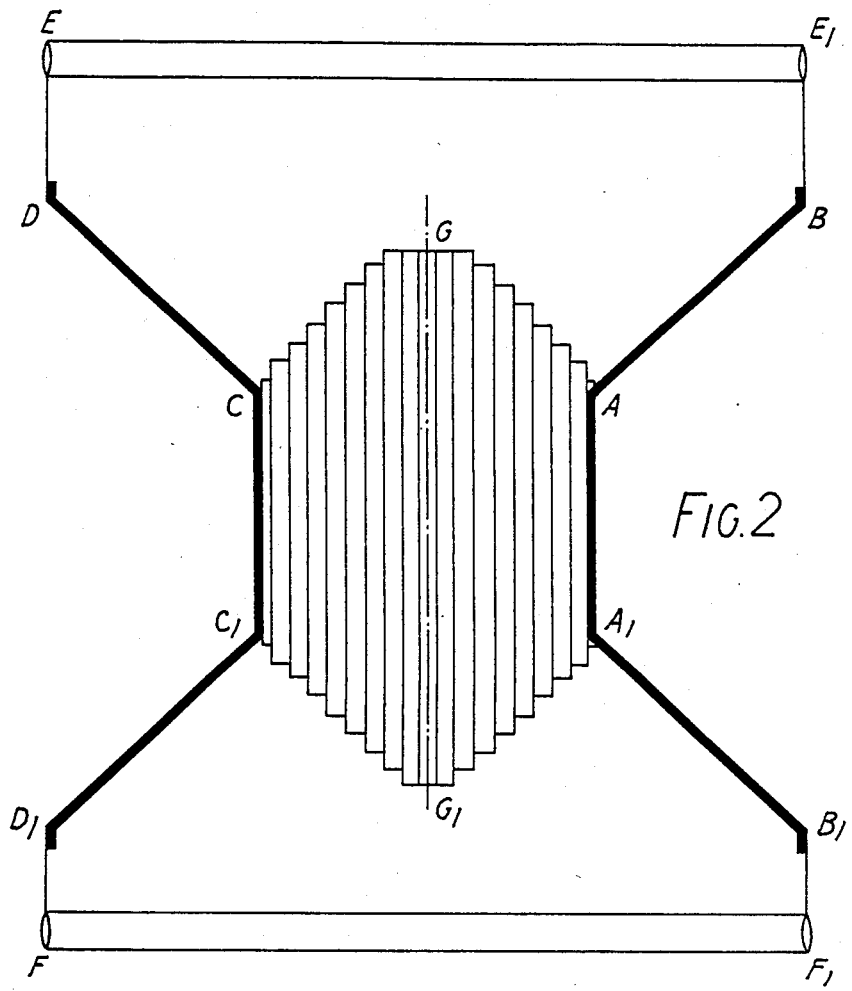
FIG.2
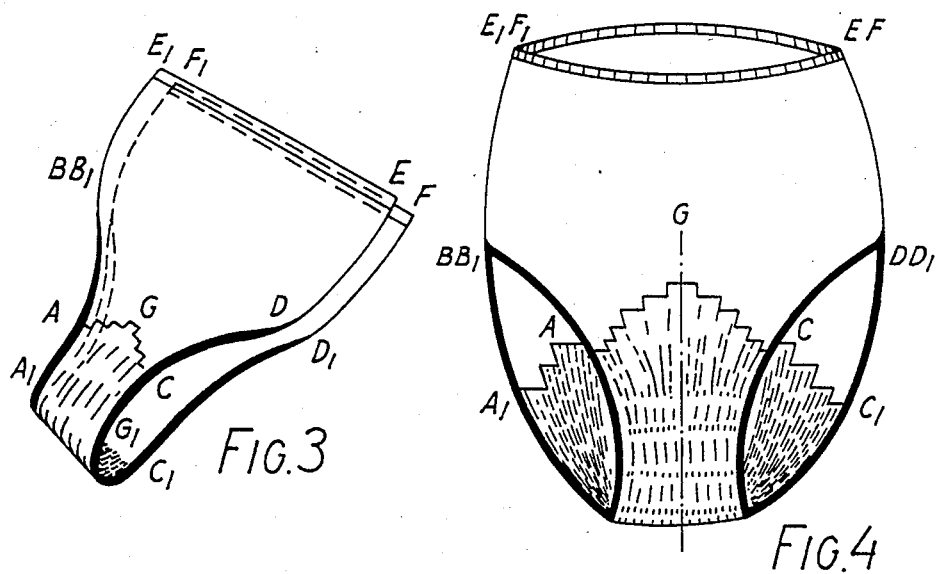
FIG.3
FIG.4

METHOD OF MANUFACTURING KNITTED BRIEFS

The present invention relates to the manufacture of knitted briefs.

By briefs is meant a garment comprising a body portion adapted to cover the lower portion of a wearer's trunk from the waist downwards to and beneath the crotch, and having therein leg openings at respectively opposite sides of the crotch portion which closes the garment at its lower end.

FIG. 1 of British Patent No. 1485952 illustrates the profile of the flat knitted brief blank traditionally produced prior to side seaming into a brief proper. The blank profile consists of spaced generally rectangular portions connected by way of respective adjoining trapezium-shaped portions, the narrower ends of which are connected by way of an intervening bridge portion. In use, the rectangular portions form the front and back of the ultimate briefs, the edges of the trapezium shaped portions from the leg openings and the intervening bridge portion forms the crotch.

Historically, a blank of the above shape was produced either by cutting from flat fabric or by walewise fashioning by transference of loops on a straight-bar knitting machine. Our above identified British patent however discloses a method of knitting a seamless tubular blank on a circular seamless hose machine prior to slitting the tube to provide a flattened blank of the required profile.

In accordance with one aspect of the present invention there is provided a method of knitting a plurality of brief blanks of the required form upon a circular knitting machine which comprises knitting the blanks inter-connected in side-by-side relationship in the form of a tube, slitting the tube walewise as it is being knitted on the machine to sever the connection between the inter-connected blanks, and coursewise separating successive blanks to provide a plurality of separated brief blanks of the required form.

Also, in accordance with a second aspect of the present invention there is provided a method of knitting a plurality of brief blanks of the required form upon a circular knitting machine which comprises knitting the blanks inter-connected in side-by-side relationship in the form of a tube, removing the tube from the machine, slitting the tube walewise to sever the connection between the inter-connected blanks, and coursewise separating successive blanks to provide a plurality of separated brief blanks of the required form.

The tube may be slit walewise a plurality of times to provide a corresponding plurality of brief blanks. Alternatively, where two blanks are involved, the tube may for example be collapsed and the two walewise slits performed simultaneously, for example by a common hot wire device.

The invention will now be described further by way of example with reference to the accompanying drawings in which:

FIG. 2 shows one of the opened out flat knitted brief blanks produced from the knitted tube shown in FIG. 1, FIG. 3 illustrates the blank of FIG. 2 folded over into brief form, ready for seaming, and FIG. 4 illustrates briefs completed from the folded over blank of FIG. 3.

Figure 1:
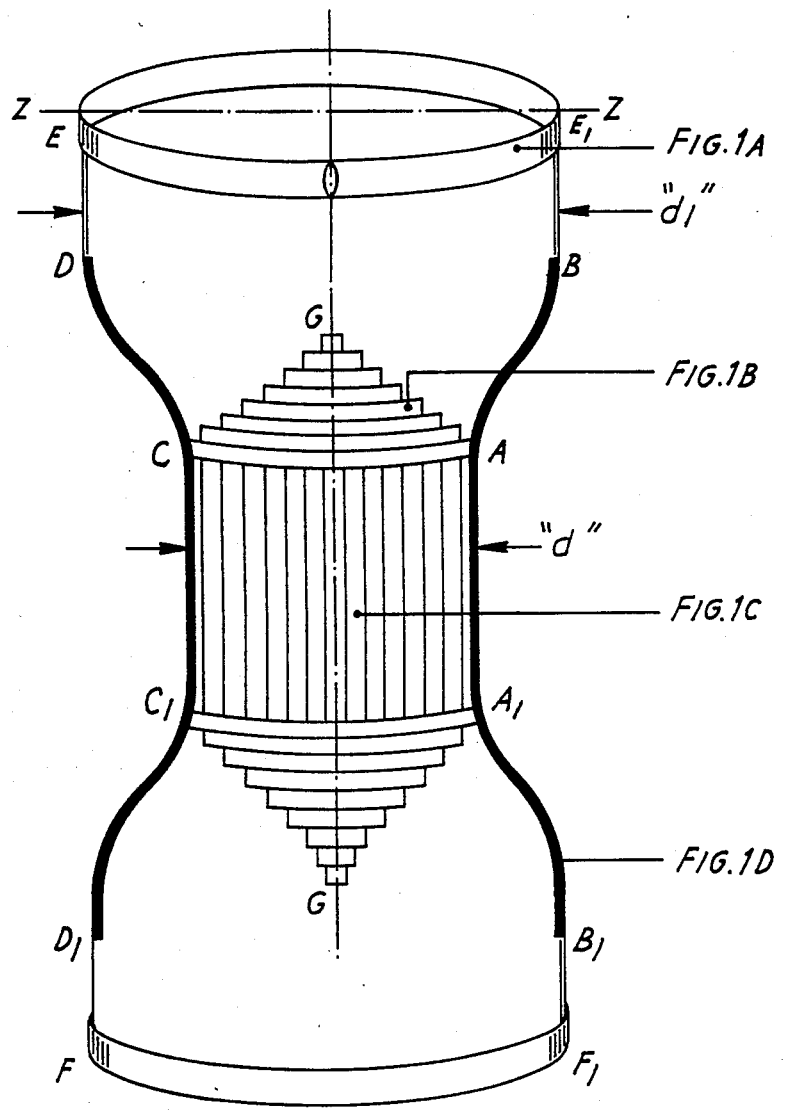
FIG. 1 shows, in diagrammatic form, an unslit, waisted tube as taken down from a circular knitting machine, the knitted loop structure for the indicated parts being as given to the right of the FIG., in FIGS. 1A, 1B, 1C and 1D.

A waisted tube shown in FIG. 1 is knitted by wholly rotary knitting on a multi-feed circular knitting machine. The tube consists of two connected brief blanks of the required generally hourglass form. In FIG. 1 the blanks are shown in overlying relationship, the portions E, $E_1$, and F, $F_1$ alternatively forming the waist band of the briefs produced from the upper brief blank. In order to facilitate separation of the two blanks, a number of needles, typically three, are omitted at diametrically opposite portions of the tube indicated at Z, Z.

Figure 1A:
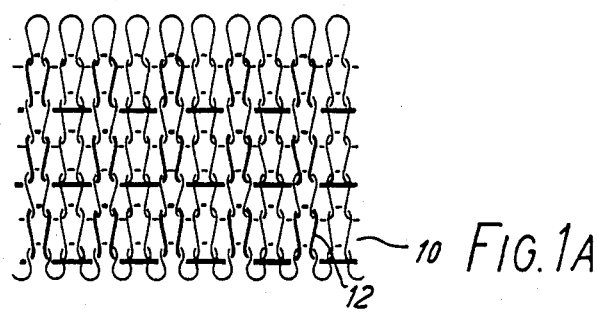

Half of the waistbands for each of the two blanks is knitted first, the knitted structure being as illustrated in FIG. 1A. The portion E, $E_1$ of the waistband consists of 184 courses of a fabric knitted from Helanca (Trade Mark) yarn 10, a Lycra (Trade Mark) yarn 12 being laid-in in alternate wales and floated across the intervening wales on a $1 \times 1$ knit/float basis.

Figure 1B:
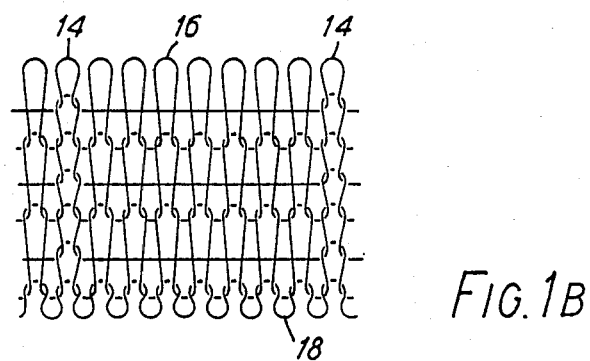

The body portion of the brief is then knitted, the portion E, D, B, $E_1$ having the same extent as the waistband portion E, $E_1$. The crotch portion C, A, $C_1$, $A_1$ having an extent of approximately ⅓ of that of the waistband portion E, $E_1$. G, $G_1$, are non-symmetrical centres of the crotch portion. The fabric portions E, D, C, G, A, B, $E_1$ and F, $D_1$, $C_1$, $G_1$, $A_1$, $B_1$, $F_1$ are both of plain stitch fabric of Helanca yarn. The edges of a fabric shown in FIG. 1 at D, $D_1$ and B, $B_1$ respectively form the leg openings in the ultimate briefs with the edges C, $C_1$ and A, $A_1$ forming the crotch portion. The structure of the portions C, A, G and $C_1$, $A_1$, $G_1$ are given in FIG. 1B and are knitted on a $7 \times 1$ basis from Helanca yarn. The fabric has two spaced wales 14 of plain stitches, the intervening seven wales being knitted at alternate courses 16.

Figure 1C:
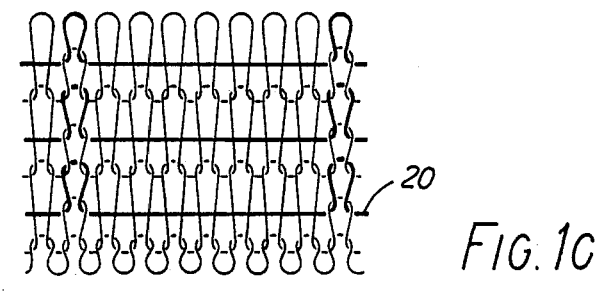
Figure 1D:
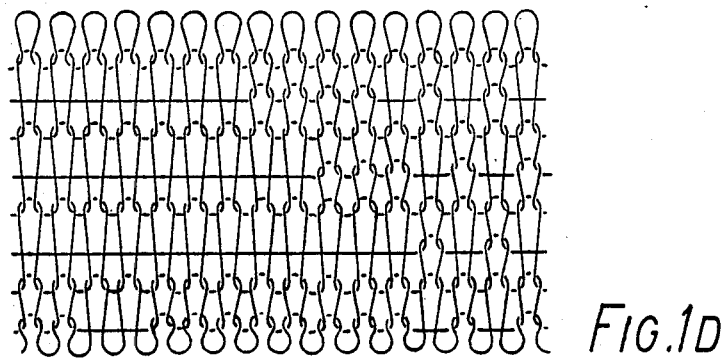

The points $CC_1$ and $AA_1$ indicate the start of the intervening elasticated construction of the crotch the structure of which is illustrated in FIG. 1C. This structure is identical to that of FIG. 1B but with a Lycra yarn used in conjunction with the floated Helanca yarn.

The two yarns are knitted together in widely spaced wales only, i.e. only each eighth wale and are elsewhere floated across the intervening wales. Thus, the floats are long ones serving to contract the fabric coursewise in the area of the crotch resulting in a related width, d, which is approximately one-third of the width $d_1$, of the body portion. Finally, a turned welt similar to E, $E_1$ and of the structure illustrated in FIG. 1A is knitted together with a plain run-off section (not shown). The run-off section is of sufficient length to lock the ends of the tubular waistband portions together to facilitate press-off of a finished tube.

When the tube has been knitted and taken down from the machine, it is slit walewise as described, either with a single or a plurality of slit operations using a hot wire cutter or cutters at each of the two slitting positions where the three needles were omitted.

The blank is then folded over as shown FIG. 3 and the side edges of the blanks seamed using an overlock or flat lock machine. A completed brief as shown in FIG. 4 is thus provided.

I claim:

1. In a method of knitting a plurality of brief blanks upon a circular knitting machine the improvement of knitting the blanks inter-connected in full side-by-side relationship in the form of a tube, slitting the tube walewise as it is being knitted on the machine to sever the connection between the inter-connected blanks, and coursewise separating successive blanks to provide a plurality of separated brief blanks of the required form.

2. A method as set forth in claim 1 additionally comprising individually slitting the tube a plurality of times to provide a corresponding plurality of brief blanks.

3. A method as set forth in claim 1 when used for producing a pair of brief blanks in full side-by side relationship which additionally comprises the step of collapsing the tube and slitting the collapsed tube walewise upon a common slitting device.

4. In a method of knitting a plurality of brief blanks upon a circular knitting machine the improvement of knitting the blanks inter-connected in full side-by-side relationship in the form of a tube, removing the tube from the machine, slitting the tube walewise to sever the connection between the inter-connected blanks, and coursewise separating successive blanks to provide a plurality of separated brief blanks of the required form.

5. A method as set forth in claim 4 additionally comprising individually slitting the tube a plurality of times to provide a corresponding plurality of brief blanks.

6. A method as set forth in claim 4 when used for producing a pair of brief blanks in full side-by-side relationship which additionally comprises the step of collapsing the tube and slitting the collapsed tube walewise upon a common slitting device.

7. A method of knitting a plurality of brief blanks upon a circular knitting machine, said method comprising knitting a row including a plurality of blanks inter-connected in full side-by-side relationship in the form of a tube.

8. A method according to claim 7 wherein each brief blank is formed with two waist portions.

9. A method according to claim 7 wherein each brief blank is formed with two waist portions disposed in remote relation.

10. A method acccording to claim 7 wherein each brief blank is formed with two waist portions each extending only partially around the tube.

* * * * *